(12) United States Patent
Huang et al.

(10) Patent No.: US 8,071,489 B2
(45) Date of Patent: Dec. 6, 2011

(54) AMPHOTERIC FLUOROCHEMICALS FOR PAPER

(75) Inventors: Hsu-Nan Huang, Newark, DE (US); Martial Jean-Jacques Pabon, Neauphlette (FR); Romain Severac, La Roche Guyon (FR); Lamia Heuze, Bonnieres sur Seine (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1182 days.

(21) Appl. No.: 11/827,006

(22) Filed: Jul. 10, 2007

(65) Prior Publication Data
US 2009/0017321 A1    Jan. 15, 2009

(51) Int. Cl.
*B32B 27/04* (2006.01)

(52) U.S. Cl. .................... 442/93; 442/94; 8/115.51

(58) Field of Classification Search ............ 442/93, 442/94
See application file for complete search history.

(56) References Cited

U.S. PATENT DOCUMENTS

| | | | |
|---|---|---|---|
| 3,578,487 A | 5/1971 | Knell et al. |
| 3,758,543 A | 9/1973 | Anello et al. |
| 3,843,579 A | 10/1974 | Eanzel |
| 4,147,851 A | 4/1979 | Raynolds |
| 4,582,882 A | 4/1986 | Lynn et al. |
| 4,595,518 A | 6/1986 | Raynolds et al. |
| 4,778,915 A | 10/1988 | Lina et al. |
| 5,010,141 A | 4/1991 | Meuller |
| 5,439,998 A | 8/1995 | Lina et al. |
| 5,558,940 A | 9/1996 | Michels et al. |
| 5,674,961 A | 10/1997 | Fitzgerald |
| 5,919,527 A | 7/1999 | Fitzgerald et al. |
| 6,111,043 A | 8/2000 | Corpart et al. |
| 6,518,380 B2 | 2/2003 | Juhue et al. |
| 6,566,470 B2 | 5/2003 | Kantamneni et al. |
| 6,699,933 B2 | 3/2004 | Nguyen et al. |
| 2001/0020077 A1 | 9/2001 | Juhue et al. |
| 2002/0052457 A1 | 5/2002 | Fitzgerald |

FOREIGN PATENT DOCUMENTS

| | | |
|---|---|---|
| DE | 2140261 | 2/1973 |
| FR | 1400038 | 5/1965 |
| JP | 49042878 | 11/1974 |
| JP | 58220894 | 12/1983 |
| WO | WO96/30584 | 10/1996 |
| WO | WO97/39072 | 10/1997 |
| WO | WO 01/79313 A1 | 10/2001 |
| WO | WO 03106519 | 12/2003 |
| WO | WO 2005/090423 A1 | 9/2005 |

OTHER PUBLICATIONS

Zhou et al., Preparation and performance measurement of organo-fluorine textile finishing agent, Jingxi Huagong (2002), 19(Zengkan), 77-79; Jingxi Huangong Bianjibu, Nanjing, PRC. Abstract.

Ishikawa et al., Effects of perfluoroalkyl chain length in fluorine-containing agents on oil resistance of paper prepared with the agents, Kami Parupu Kenkyu Happyokai Koen Yoshishu (2004), 72st, 98-101; Kami Parupu Gijutsu Kyokai, Japan. Abstract.

Honda et al., Molecular Aggregation Structure and Surface Properties of Poly(fluoroalkyl acrylate) Thin Films, Macromolecules (2005), 38, 5699-5705.

*Primary Examiner* — Lynda Salvatore
(74) *Attorney, Agent, or Firm* — Nancy S. Mayer

(57) ABSTRACT

A method of imparting oil repellency to flexible, fibrous, nonwoven substrates comprising contacting the substrate with an amphoteric fluorochemical copolymer composition prepared from polymerization of monomers in the following percentages by weight: (a) from about 60% to about 90% of a fluorinated (meth)acrylate monomer of Formula 1 which is $R_f\text{-Q-CO}-CR=CH_2$, (b) from about 10% to about 25% of an amine substituted (meth)acrylate or (meth)acylamide monomer of Formula 2 which is $CH_2=C(R)COZ(CH_2)q(CHR)_rNR^2R^3$, and (c) from about 1% to about 15% of a substituted (meth)acrylic acid monomer of Formula 3 which is $CH_2=CR(R^5)_e-COOH$.

23 Claims, No Drawings

AMPHOTERIC FLUOROCHEMICALS FOR PAPER

BACKGROUND OF THE INVENTION

Perfluoroalkyl-substituted compounds are used to impart oil and grease repellency to textile and paper substrates. A stain or leak proof barrier is especially desirable for paper used in many food-packaging applications.

Most commercially available fluorinated polymers useful as treating agents for imparting repellency to substrates contain predominately eight or more carbons in the perfluoroalkyl chain to provide the desired repellency properties. Honda et al., in Macromolecules, 2005, 38, 5699-5705 show that for perfluoroalkyl chains of 8 carbons or greater, orientation of the perfluoroalkyl groups is maintained in a parallel configuration, while reorientation occurs for such chains having 6 carbon atoms or less. Such reorientation decreases surface properties such as receding contact angle. Thus, shorter chain perfluoroalkyls have traditionally not been successful commercially.

Raynolds in U.S. Pat. No. 4,147,851 disclosed imparting oil and water repellency to fabric and paper by treatment with copolymers comprising (i) units derived from a perfluoroaliphatic acrylate or methacrylate monomer, and (ii) units derived from a dialkylaminoalkyl acrylate or methacrylate, or the corresponding acrylamide or methacrylamide monomer in its amine salt, quaternary ammonium or amine oxide form.

Fitzgerald et al., in U.S. Pat. No. 5,919,527, described another copolymer for treating hard surfaces comprising (i) units derived from a perfluoroalkylalkyl acrylate or methacrylate, monomers, and (ii) units derived from a dialkylaminoalkyl acrylate or methacrylate, or the corresponding acrylamide or methacrylamide monomer in its amine salt, quaternary ammonium or amine oxide form. Optionally, units derived from additional monomers were included selected from the monomer group consisting of glycidyl(meth)acrylate, blocked isocyanatoalkyl(meth)acrylate, acrylamide, vinylidene chloride, (meth)acrylic acid, sulfatoalkyl(meth)acrylate, polyoxyethylene (meth)acrylate, styrene and vinyl toluene. The above copolymers were used to provide oil, water, and stain repellency to hard surface materials used primarily for building or construction purposes such as brick, stone, concrete, tile, glass, plaster, and similar materials. There is no disclosure that such compositions are suitable for use on paper.

It is desirable to improve the method of providing oil and water repellency to paper through use of fluorochemical copolymers which do not require the use of monomers which may create difficult to remove residual toxic by-products. It is also desirable to provide copolymers useful in providing oil repellency and grease repellency to paper having perfluorinated chains of eight carbon atoms or less, thus using lower amounts of expensive fluorine, without adversely affecting the repellency performance. The present invention provides such a copolymer, a process for its preparation, and a method of treating paper for repellency.

SUMMARY OF THE INVENTION

The present invention comprises a method of imparting oil repellency and grease repellency to a flexible, fibrous, nonwoven substrate comprising contacting the substrate with a copolymer prepared from monomers copolymerized in the following percentages by weight:

(a) from about 60% to about 90% of a monomer of Formula 1, or a mixture thereof:

$$R_f\text{-}Q\text{-}CO\text{---}CR\text{=}CH_2 \qquad \text{Formula 1}$$

wherein:
$R_f$ is a straight- or branched-chain perfluoroalkyl group of 2 to about 20 carbon atoms or a mixture thereof,
R is H or $CH_3$,
Q is $-(C_nH_{2n})_x(C_nH_{2n}O)_y-$, $-(C_nH_{2n})_pSO_2NR^1(C_nH_{2n}O)_y-$, or $-(C_nH_{2n})_xCONR^1(C_nH_{2n}O)_y-$, wherein the $-(C_nH_{2n})$ is bonded to $R_f$,
$R^1$ is H or $C_1$-$C_{20}$ alkyl,
each n is independently 1 to about 6, x is 0 to about 4, p is 1 to about 20, and y is 0 to about 4, provided that x+y is a positive integer;

(b) from about 10% to about 25% of a monomer of Formula 2, or a mixture thereof:

$$CH_2\text{=}C(R)COZ(CH_2)_q(CHR)_rNR^2R^3 \qquad \text{Formula 2}$$

wherein
R, is H or $CH_3$,
$R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring,
Z is $-O-$ or $-NR^4-$ wherein $R^4$ is H or $C_1$-$C_4$ alkyl,
r is 0 to 4, and
q is 1 to 4,
provided that the nitrogen bonded to $R^2$ and $R^3$ is from about 0% to 100% salinized, quaternized, or present as amine oxide; and (c) from about 1% to about 15% of a monomer of Formula 3, or a mixture thereof:

$$CH_2\text{=}CR(R^5)_e\text{---}COOH \qquad \text{Formula 3}$$

wherein
R is H or $CH_3$,
$R^5$ is $CO(CH_2)_5$, $CO-O-(CH_2)_2$, $C_6H_4CHR$, or $CONRR^6$,
$R^6$ is $C_6H_4OCH_2$, $(CH_2)_d$, or $C(CH_3)_2CH_2$,
d is 1 to about 10, and
e is 0 or 1,
provided that when Formula 1 is $$F(CF_2CF_2)_mC_2H_4SO_2N(CH_3)C_2H_4OC(O)C(R)\text{=}CH_2$$

wherein m is from about 1 to about 10,
then Formula 3 is present at a minimum of about 4% by weight.

The present invention further comprises a substrate treated by the method described above.

The present invention further comprises a copolymer comprising monomers copolymerized in the following percentages by weight:

(a) from about 60% to about 90% of a monomer of Formula 1A or a mixture thereof:

$$R_f\text{-}Q\text{-}CO\text{---}CR\text{=}CH_2 \qquad \text{Formula 1A}$$

wherein:
$R_f$ is a straight- or branched-chain perfluoroalkyl group of 2 to about 20 carbon atoms,
R is H or $CH_3$,
Q is $-(C_nH_{2n})_pSO_2NR^1(C_nH_{2n}O)_y-$, wherein the $-(C_nH_{2n})$ is bonded to $R_f$,
$R^1$ is H or $C_1$-$C_{20}$ alkyl and
each n is independently 1 to about 6,
p is 1 to about 20, and y is 0 to about 4, (b) from about 10% to about 25% of a monomer of Formula 2 or a mixture thereof:

$$CH_2=C(R)COZ(CH_2)_q(CHR)_rNR^2R^3 \quad \text{Formula 2}$$

wherein
R is H or $CH_3$,
$R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring,
Z is —O— or —$NR^4$— wherein $R^4$ is H or $C_1$-$C_4$ alkyl,
r is 0 to 4,
q is 1 to 4 and
provided that the nitrogen bonded to $R^2$ and $R^3$ is from about 0% to 100% salinized, quaternized, or present as amine oxide; and
(c) from about 1% to about 15% of a monomer of Formula 3 or a mixture thereof:

$$CH_2=CR(R^5)_e-COOH \quad \text{Formula 3}$$

wherein
R is H or $CH_3$,
$R^5$ is $CO(CH_2)_5$, CO—O—$(CH_2)_2$, $C_6H_4CHR$, or $CONRR^6$,
$R^6$ is $C_6H_4OCH_2$, $(CH_2)_d$, or $C(CH_3)_2CH_2$,
d is 1 to about 10, and
e is 0 or 1,
provided that when Formula 1 is $$F(CF_2CF_2)_mC_2H_4SO_2N(CH_3)C_2H_4OC(O)C(R)=CH_2$$

wherein
m is from about 1 to about 10,
then Formula 3 is present at a minimum of about 4% by weight.

The present invention further comprises an improved process for polymerization of Formula 1, Formula 2, and Formula 3, each as defined above, wherein the improvement comprises avoiding gel formation by addition of Formula 3 after polymerization temperature is reached.

DETAILED DESCRIPTION

Herein trademarks are shown in upper case.

The terms (meth)acrylic or (meth)acrylate indicate respectively methacrylic and/or acrylic and methacrylate and/or acrylate and the term (meth)acrylamide indicates methacrylamide and/or acrylamide.

The present invention comprises a method of providing oil repellency to flexible fibrous nonwoven substrates comprising contacting said substrate with a copolymer prepared from monomers copolymerized in the following percentages by weight:
(a) from about 60% to about 90% of a monomer of Formula 1, or a mixture thereof:

$$R_f\text{-Q-CO—CR}=CH_2 \quad \text{Formula 1}$$

wherein:
$R_f$ is a straight- or branched-chain perfluoroalkyl group of 2 to about 20 carbon atoms or a mixture thereof,
R is H or $CH_3$,
Q is —$(C_nH_{2n})_x(C_nH_{2n}O)_y$—, —$(C_nH_{2n})_pSO_2NR^1(C_nH_{2n}O)_y$—, or —$(C_nH_{2n})_xCONR^1(C_nH_{2n}O)_y$—, wherein the —$(C_nH_{2n})$ is bonded to $R_f$,
$R^1$ is H or $C_1$-$C_{20}$ alkyl,
each n is independently 1 to about 6, x is 0 to about 4, p is 1 to about 20, and y is 0 to about 4, provided that x+y is a positive integer;
(b) from about 10% to about 25% of a monomer of Formula 2, or a mixture thereof:

$$CH_2=C(R)COZ(CH_2)q(CHR)_rNR^2R^3 \quad \text{Formula 2}$$

wherein
R, is H or $CH_3$,
$R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring,
Z is —O— or —$NR^4$—
wherein
$R^4$ is H or $C_1$-$C_4$ alkyl,
r is 0 to 4, and
q is 1 to 4,
provided that the nitrogen bonded to $R^2$ and $R^3$ is from about 0% to 100% salinized, quaternized, or present as amine oxide; and
(c) from about 1% to about 15% of a monomer of Formula 3, or a mixture thereof:

$$CH_2=CR(R^5)_e-COOH \quad \text{Formula 3}$$

wherein
R is H or $CH_3$,
$R^5$ is $CO(CH_2)_5$, CO—O—$(CH_2)_2$, $C_6H_4CHR$, or $CONRR^6$,
$R^6$ is $C_6H_4OCH_2$, $(CH_2)_d$, or $C(CH_3)_2CH_2$,
d is 1 to about 10, and
e is 0 or 1,
provided that when Formula 1 is $$F(CF_2CF_2)_mC_2H_4SO_2N(CH_3)C_2H_4OC(O)C(R)=CH_2$$

wherein
m is from about 1 to about 10,
then Formula 3 is present at a minimum of about 4% by weight.

The resulting copolymer has repeating units as shown in Structure A below. The amphoteric (meth)acrylate copolymers of Structure A comprise one or more repeating units derived from monomers from each of three groups. Group 1 repeating units derive from monomers of Formula 1 described above such as perfluoroalkylalkyl(meth)acrylates, Group 2 repeating units derive from monomers of Formula 2 described above such as dialkylaminoalkyl(meth)acrylates or dialkylaminoalkyl (meth)acrylamides, and Group 3 repeating units derive from monomers of Formula 3 described above such as (meth)acrylic acid. The repeating units, shown in the following structure, can occur in any sequence, and in the proportions described below. Structure A is Structure A $$\left[\begin{array}{c} CH_2-CR \\ | \\ C=O \\ | \\ Q \\ | \\ R_f \end{array}\right] \left[\begin{array}{c} CH_2-CR \\ | \\ C=O \\ | \\ Z \\ | \\ (CH_2)_q \\ | \\ (CHR)_r \\ | \\ B \end{array}\right] \left[\begin{array}{c} CH_2-CR \\ | \\ (R^5)_e \\ | \\ C=O \\ | \\ OH \end{array}\right]$$

Group 1       Group 2       Group 3 wherein
$R_f$ is a straight- or branched-chain perfluoroalkyl group of about 2 to about 20, preferably from about 4 to about 8, and more preferably from about 4 to about 6 carbon atoms, Q is —$(C_nH_{2n})_x(C_nH_{2n}O)_y$—, —$(C_nH_{2n})_pSO_2NR^1(C_nH_{2n}O)_y$—, or —$(C_nH_{2n})_xCONR^1(C_nH_{2n}O)_y$—, wherein the —$(C_nH_{2n})$ is bonded to $R_f$, each R is independently H or $CH_3$, $R^1$ is H or $C_1$-$C_{20}$ alkyl, each n is independently 1 to about 6, x and y are independently 0 to about 4, such that (x+y) is greater than 0 p is 1 to about 20,

Z is —O— or —$NR^4$— r is 0 to 4, q is 1 to 4,

B is —$N^+R^2R^3R^4X^-$ or —$NR^2R^3O$, $X^-$ is a monovalent anion, such as an alkanoate $R''COO^-$ wherein $R''$ is $C_1$ to about $C_5$, dihydrogen phosphate $H2PO4^-$, borate $HBO^-$, a $C_1$ to $C_6$ hydroxy or polyhydroxy carboxylate or hydroxy or polyhydroxy polycarboxylate including glycolate and dihydrogen citrate, oxalate $HOOCCOO^-$, chloride, or hydrogen sulfate $HSO_4^-$, and preferably $X^-$ is acetate, chloride, or hydrogen sulfate ($CH_3COO^-$, $Cl^-$, or $HSO_4^-$), $R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring, $R^4$ is H or $C_1$-$C_4$ alkyl or $R^2$, $R^3$, and $R.^4$ together with the nitrogen form a piperidine ring, $R^5$ is $CO(CH_2)_5$, $CO$—$O$—$(CH_2)_2$, $C_6H_4CHR$, or $CONRR^6$, $R^6$ is $C_6H_4OCH_2$, $(CH_2)_d$, or $C(CH_3)_2CH_2$, d is 1 to about 10, and e is 0 or 1.

Examples of additional monomers that may be substituted for Group 3 include:

$CH_2$=$CH$—$COOH$ $CH_2$=$C(CH_3)$—$COOH$ $CH_2$=$CH$—$CO$—$N(CH_3)$—$CH_2$—$CH_2$—$COOH$, $CH_2$=$CH$—$CO$—$(CH_2)_5$—$COOH$, $CH_2$=$CH$—$CO$—$NH$-$pC_6H_4$—$O$—$CH_2$—$COOH$, $CH_2$=$CH$—$CO$—$NH$—$C(CH_3)_2$—$CH_2$—$COOH$, $CH_2$=$CH$—$CO$—$O$—$(CH_2)_2$—$COOH$, $CH_2$=$CH$—$CO$—$NH$—$CH_2$—$COOH$, $CH_2$=$CH$—$CO$—$NH$—$(CH_2)_5$—$COOH$, $CH_2$=$C(CH_3)$—$CO$—$NH$—$(CH_2)_{10}$—$COOH$, $CH_2$=$C(CH_3)$—$CO$—$NH$—$CH_2$—$COOH$, $CH_2$=$C(CH_3)$—$CO$—$O$—$(CH_2)_2$—$COOH$, $CH_2$=$C(CH_3)$-$mC_6H_4$—$CH(CH_3)$—$COOH$, and $CH_2$=$CH$-$pC_6H_4$—$CH_2$—$COOH$.

The monomer of Formula 1 yields the Group 1 repeating unit in the copolymer of Structure A. The monomer of Formula 2 yields the Group 2 repeating unit in the copolymer of Structure A after salinization or oxidation, a step discussed below. The monomer of Formula 3 yields the Group 3 repeating unit in the copolymer of Structure A Preferably, $R_f$ in Structure A is a perfluoroalkyl group predominately containing from 2 to 8 carbon atoms. More particularly $R_f$ in Formula 1 is a straight chain perfluoroalkyl group of 4 to about 6 carbon atoms. One preferred embodiment of the monomer of Formula 1 is a perfluoroalkylethyl (meth)acrylate having the formula:

$$F(CF_2CF_2)_mC_2H_4OC(O)—C(R)=CH_2$$

wherein m is 2 to about 10 or a mixture thereof, and preferably predominately 2 or 3 or a mixture thereof, and R is H or methyl.

Within moiety Q the $(C_nH_{2n})$ group and the $(C_nH_{2n}O)$ group are linear or branched, and preferably are linear. For $R^1$ the $C_1$-$C_{20}$ alkyl is linear or branched.

Preferably the monomer of Formula 2 is diethylaminoethyl and/or dimethylaminoethyl methacrylate, and the monomer of Formula 3 is (meth)acrylic acid or acrylic acid.

The proportion of the monomer of Formula 1 (monomer of Group 1) is present in an amount of at least 60% relative to the total weight of the copolymer. Preferably it is present at from about 72% to about 82% by weight. The monomer of Formula 2 (the precursor of monomer of Group 2) is present at from about 10% to about 25% by weight of the copolymer. Preferably it is present at from about 15% to about 19% by weight. The monomer of Formula 3 (monomer of Group 3) is present at from about 1% to about 15% by weight of the copolymer. Preferably it is present at from about 2.5% to about 9% by weight. The total of the monomers of Formula 1, 2, and 3 add to 100%. In the final copolymer, the sum of the monomer weights adds to 100% of the copolymer weight.

The copolymer as described above used in the method of the present invention is preferably in the form of a dispersion. It is typically employed as an aqueous dispersion.

In one embodiment, after copolymerization the copolymer is optionally partially or completely salinized or quaternized to provide the copolymer of Structure A. Salinization is accomplished in an aqueous system using an acid to convert the copolymerized monomer of Formula 2 to the copolymerized group of the structure of Formula 2A:

Formula 2A

After the salinization step, the diethylaminoethyl acrylate and/or dimethylaminoethyl methacrylate is from about 0% to about 100% salinized or quaternized. Preferably the degree of salinization or quaternization is from about 50% to 100%. The free amine groups in the copolymer can then be reacted with a salinizing agent such as acetic acid, resulting in the conversion of part or all of the amine moieties to the corresponding acetate. The salinizing/quaternizing group can be acetate, halide, sulfate or other known salinizing/quaternizing groups. Conventional techniques known to those skilled in the art for salinizing and quaternizing amine groups in copolymers are employed in the present invention.

In another embodiment, after copolymerization the copolymer is optionally partially or completely oxidized the copolymer of Structure A. Amine oxidation is accomplished in an aqueous system using, for instance, hydrogen peroxide to convert the copolymerized monomer of Formula 2 to the copolymerized group of the structure of Formula 2B:

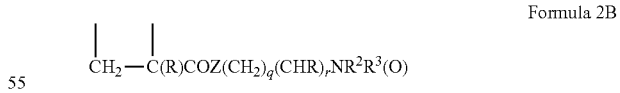

Formula 2B

After the oxidation step, the diethylaminoethyl acrylate and/or dimethylaminoethyl methacrylate is from about 0% to about 100% oxidized. Preferably the degree of oxidation is from about 50% to 100%. Conventional techniques known to those skilled in the art for oxidizing amine groups in copolymers are employed in the present invention.

Alternatively the copolymer can contain a mixture of Formula 2A and Formula 2B. When such mixtures are present, the salinization and oxidation can be conducted in any sequence, or simultaneously. Preferred is to conduct these reactions simultaneously.

Optionally, the amphoteric copolymers of Structure A used in the method of the present invention additionally contain 0 to about 15% by weight, preferably 0 to about 10% by weight, based on the total monomers from Groups 1, 2, and 3, of one or more of the monomers glycidyl(meth)acrylate, vinylidene chloride, vinyl acetate, alkyl (meth)acrylate, or hydroxyalkylene (meth)acrylate. An example of an alkyl(meth)acrylate is $C_{16}$-$C_{18}$-alkyl(meth)acrylate; an example of a hydroxyalkylene (meth)acrylate is 7EO-(meth)acrylate, $[CH_2CH(CH_3)C(O)O(CH_2CH_2O)_j H$ where the average value of j (indicated by 7EO) is 7] available from Polyscience, Niles, Ill. Toxic monomers, such as glycidyl methacrylate are not employed if the copolymer will be used in food packaging applications.

The present invention further comprises an improved process for the preparation of an amphoteric fluorochemical copolymer made from a mixture of monomers of a) Formula 1, b) Formula 2, and c) Formula 3, wherein (a) Formula 1 is $$R_f\text{-Q-CO—CR}=CH_2 \quad \text{Formula 1}$$

wherein:

$R_f$ is a straight- or branched-chain perfluoroalkyl group of 2 to about 20 carbon atoms or a mixture thereof, R is H or $CH_3$, Q is $-(C_nH_{2n})_x(C_nH_{2n}O)_y-$, $-(C_nH_{2n})_pSO_2NR^1(C_nH_{2n}O)_y-$, or $-(C_nH_{2n})_xCONR^1(C_nH_{2n}O)_y-$, wherein the $-(C_nH_{2n})$ is bonded to $R_f$, $R^1$ is H or $C_1$-$C_{20}$ alkyl, each n is independently 1 to about 6, x is 0 to about 4, p is 1 to about 20, and y is 0 to about 4, provided that x+y is a positive integer;

(b) from about 10% to about 25% of a monomer of Formula 2, or a mixture thereof:

$$CH_2=C(R)COZ(CH_2)_q(CHR)_rNR^2R^3 \quad \text{Formula 2}$$

wherein

R, is H or $CH_3$, $R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring, Z is —O— or —$NR^4$— wherein $R^4$ is H or $C_1$-$C_4$ alkyl, r is 0 to 4, and q is 1 to 4, provided that the nitrogen bonded to $R^2$ and $R^3$ is from about 0% to 100% salinized, quaternized, or present as amine oxide; and (c) from about 1% to about 15% of a monomer of Formula 3, or a mixture thereof:

$$CH_2=CR(R^5)_e\text{—COOH} \quad \text{Formula 3}$$

wherein

R is H or $CH_3$, $R^5$ is $CO(CH_2)_5$, CO—O—$(CH_2)_2$, $C_6H_4CHR$, or $CONRR^6$, $R^6$ is $C_6H_4OCH_2$, $(CH_2)_d$, or $C(CH_3)_2CH_2$, d is 1 to about 10, and e is 0 or 1, wherein the improvement comprises avoiding gel formation by delaying addition of Formula 3 to the mixture until after said mixture has reached a temperature of from about 60° C. to about 75° C.

Care is necessary to avoid gel formation during certain polymerizations. For effective application to a substrate, a dispersion that is free of gel particles is necessary. Gel may form, for instance, when the Rf group is longer (one or more homologs containing 8 or more carbon atoms) or with polymerization solvent mixtures containing higher concentrations of isopropyl alcohol. In such cases, the improved polymerization process of the present invention is preferred wherein gel formation is avoided by delaying the addition of the Formula 3 monomer until the nitrogen-purged reaction mass has reached the polymerization temperature defined below. In the improved polymerization process of the present invention the Formula 3 monomer is injected into the heated reaction mass without compromising the inert atmosphere. Optional additional monomers may be charged initially or subsequently injected with the monomer of Formula 3 if the latter monomer addition is delayed.

The reaction mixture is stirred at ambient temperature (about 28° C.) and purged with an inert gas such as nitrogen for about 1 hour to eliminate air. The reaction mass is then heated to from about 60° C. to about 80° C. This range is termed the "polymerization temperature". The preferable polymerization temperature is related to the reactivity of the initiator. Preferably the polymerization temperature is from about 62° C. to about 80° C., more preferably from about 64° to about 78° C., and more preferably from about 66° C. to about 72° C. When the addition of the Formula 3 monomer is delayed, it is injected, together with any optional monomers, into the reaction mixture as soon as the polymerization temperature has been reached, or alternatively after the reaction mixture has been at the polymerization temperature for a period of about 1 to about 10 hours. The polymerization temperature is maintained until polymerization is completed, typically about 7 to about 19 hours. Gas chromatographic (GC) analysis is used to determine when the reaction is complete. A residual total unreacted monomer content of less than about 0.6%, preferably less than about 0.2%, and more preferably less than about 0.1% is desired, based on the total weight of monomers. The perfluoroalkyl(meth)acrylate of Formula 1 is typically the least reactive monomer. Since this is both the most expensive monomer present and the most difficult to strip from the dispersion, minimizing unreacted amounts of this monomer is preferred. Too short a polymerization time results in excessive unreacted monomers. Too long a polymerization time causes the reaction mass to become too viscous and thus difficult to disperse.

In the improved polymerization process of the present invention the reactor is charged with the monomers of Formula 1 and 2, a suitable free radical source as a catalyst, such as azobisisobutyronitrile (available as VAZO 64 from E. I. du Pont de Nemours and Company, Wilmington Del.); and optionally a suitable chain terminator, such as n-dodecylmercaptan. Optionally, a suitable alkali metal salt, such as sodium chloride is added. A polymerization solvent or solvent mixture is employed. Suitable solvents are alcohols and ketones having boiling points of less than 130° C. Blends of isopropanol and methyl isobutyl ketone are particularly preferred, since both solvents form azeotropes with water boiling below 100° C., facilitating their removal from the final aqueous dispersion. Preferred are isopropanol/methyl isobutyl ketone blends containing between about 20% and about 80% of methyl isobutyl ketone, more preferred are isopropanol/methyl isobutyl ketone blends containing between about 50% and about 70% of methyl isobutyl ketone.

An alternative process to introduce the (meth)acrylate structure on the polymer backbone is to not add or to add only a portion of the (meth)acrylate monomer during the polymerization, but to heat the polymer at temperature between 60 to 100° C., preferably 85 to 97° C., after the polymer is dispersed in the acetic acid aqueous solution. During the heat treatment, part of Formulae 1, 2, and/or other optional monomers on the polymer backbone can be hydrolyzed at the ester linkage to create an (meth)acrylic acid structure on the polymer backbone. The disadvantage of this alternative process is the creation of impurities, such as N,N-dialkylethylaminoethanol from Formula 2 and 2-perfluoroalkylethanol from Formula 1.

The present invention further comprises a copolymer composition, which is a subset of the copolymer of Structure A having a particular group Q. The copolymer of the present invention comprises monomers copolymerized in the following percentages by weight:

(a) from about 60% to about 90% of at least one monomer of Formula 1A:

$$R_f\text{-Q-CO—CR}=CH_2 \quad \text{Formula 1A}$$

wherein:

$R_f$ is a straight- or branched-chain perfluoroalkyl group of 2 to about 20 carbon atoms, R is H or $CH_3$, Q is $—(C_nH_{2n})_pSO_2NR^1(C_nH_{2n}O)_y—$, wherein the $—(C_nH_{2n})$ is bonded to $R_f$, $R^1$ is H or $C_1$-$C_{20}$ alkyl and each n is independently 1 to about 6, p is 1 to about 20, and y is 0 to about 4, (b) from about 10% to about 25% of a monomer of Formula 2 or a mixture thereof:

$$CH_2=C(R)COZ(CH_2)_q(CHR)_rNR^2R^3 \quad \text{Formula 2}$$

wherein

R is H or $CH_3$, $R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring, Z is —O— or —$NR^4$— wherein $R^4$ is H or $C_1$-$C_4$ alkyl, r is 0 to 4, q is 1 to 4 and provided that the nitrogen bonded to $R^2$ and $R^3$ is from about 0% to 100% salinized, quaternized, or present as amine oxide; and (c) from about 1% to about 15% of a monomer of Formula 3 or a $$CH_2=CR(R^5)_e\text{—COOH} \quad \text{Formula 3}$$

wherein

R is H or $CH_3$, $R^5$ is $CO(CH_2)_5$, CO—O—$(CH_2)_2$, $C_6H_4CHR$, or $CONRR^6$, $R^6$ is $C_6H_4OCH_2$, $(CH_2)_d$, or $C(CH_3)_2CH_2$, d is 1 to about 10, and e is 0 or 1, provided that when Formula 1 is $$F(CF_2CF_2)_mC_2H_4SO_2N(CH_3)C_2H_4OC(O)C(R)=CH_2$$

wherein m is from about 1 to about 10, then Formula 3 is present at a minimum of about 4% by weight.

A preferred embodiment of the monomer of Formula 1A is $$R_f\text{—}C_2H_4SO_2N(R^1)C_2H_4OC(O)CR=CH_2$$

wherein $R_f$ is $C_6F_{13}$, $C_4F_9$, or a mixture thereof, and $R^1$ is H or $CH_3$, and R is H or $CH_3$.

Specific suitable fluorinated acrylate monomers of Formula 1A include the following:

1) 2-[methyl[(3,3,4,4,5,5,6,6,7,7,8,8,8-tridecafluorooctyl)sulfonyl]amino]ethyl acrylate having the structure $$CH_2=CH\text{—}COO\text{—}C_2H_4\text{—}N(CH_3)\text{—}SO_2\text{—}C_2H_4\text{—}C_6F_{13};$$

2) 2-[methyl[(3,3,4,4,5,5,6,6,6-nonfluorohexyl)sulfonyl]amino]ethyl acrylate;
3) 2-[methyl[(3,3,4,4,5,5,6,6,7,7,8,8,8-tridecafluorooctyl)sulfonyl]amino]ethyl methacrylate; and
4) 2-[[(3,3,4,4,5,5,6,6,7,7,8,8,8-tridecafluorooctyl)sulfonyl]amino]ethyl methacrylate.

These monomers are prepared as disclosed by Lina et al. in U.S. Pat. No. 5,439,998.

When only short $R_f$ groups are present in monomer Formulae 1 and 1A (not more than 8 carbon atoms), gel formation is not typically present. Also, with solvent mixtures of isopropyl alcohol/methyl isobutyl ketone containing less than 30% isopropyl alcohol by weight gel formation typically does not occur. In such cases where gel formation is not a concern, a more conventional copolymerization process may be used in which the Formula 3 monomer is added simultaneously with the monomers of Formula 1 and 2 without gel formation.

The preparation of the copolymer containing the fluorinated monomer described on Formula 1A wherein Q is $—(C_nH_{2n})_pSO_2NR^1(C_nH_{2n}O)_y—$ can be performed with any suitable polymerization process, including the process previously described or other process known to those skilled in the art.

As an example, the preparation of the copolymer containing the fluorinated monomer described on Formula 1A wherein Q is $—(C_nH_{2n})_pSO_2NR^1(C_nH_{2n}O)_y—$ can be carried out in a reactor equipped with a means of agitation and a reflux condenser. The reactor is charged with all the needed monomers, an organic solvent or a mixture thereof, and optionally a chain transfer agent such as mercaptan. Examples of suitable organic solvents include alcohols, such as 2-methylpropan-2-ol, isopropanol, 2-methoxypropan-2-ol; ketones, such as acetone, methylisobutyl ketone, and methylethyl ketone; and pyrrolidones, such as n-methyl-2-pyrrolidone or mixtures thereof. Examples of chain transfer agents include mercaptoethanol, mercaptoacetic acid, stearylmercaptane, tert-dodecylmercaptane and the like.

The reaction mixture is stirred at ambient temperature (about 25° C.) and purged with an inert gas such as nitrogen for about 1 hour to eliminate air. The reaction mass is heated to within the range of from 40° C. to 100° C. Initiator as free radical source is added to the reaction mixture optionally with solvent. Examples of free radical initiators include: azo compounds, such as azobisisobutyronitrile and azo-2-cyanovaleric acid; hydroperoxides, such as cumene, t-butyl and t-amyl hydroperoxide; dialkyl peroxides, such as di-t-butyl and dicumylperoxide; peroxyesters, such as t-butylperbenzoate and di-t-butylperoxy phthalate; and diacylperoxides, such as benzoyl peroxide and lauroyl peroxide.

The reaction mass is heated and maintained at about 40 to 100° C., more preferably about 55 to 85° C., and allowed to react under inert conditions for a period of time to obtain at least 95 percent yield of polymer. Polymer yield is determined by measuring the amount of residual monomer by gas chromatography. The polymerization temperature is maintained until polymerization is completed, typically about 6 to about 20 hours. In order to decrease the level of residual monomer, additional initiator can be optionally added during this period.

The reaction mass is allowed to cool to a minimum of about 45° C., and a mixture of acetic acid and water is added drop by drop under stirring. If allowed to cool too much it becomes thick and difficult to disperse. The acetic acid solution is added to the reactor or the reactor contents poured into the acetic acid solution. A 25% to 100% excess of acetic acid over the stioichiometric amount needed to protonate all the amine groups in the copolymer is used. A larger excess of acetic acid is avoided to minimize odor. Optionally, solvents are removed by distillation or vacuum distillation. The percent solids of the dispersion is adjusted (standardized) to be from about 18% to about 32% solids by dilution with water, or by distillation of excess water prior to use.

When copolymerization is completed, subsequent steps for the preparation of the dispersions of the copolymer, or dispersions of the include flexible, fibrous, nonwoven substrates. Examples of such substrates include cellulosic papers and paper products, and flexible paper-like nonwoven products made from fibers of polymers and copolymers, inorganic materials such as glass in fibrous form, and natural fibrous materials.

The diluted dispersion of the copolymer described above is contacted with the substrate surface by any suitable method. Such application techniques are well known to those skilled in the art, and include, but are not limited to, application by brush, roller, spray, dipping, immersion, and the like. Application rates for the copolymer dispersions are in the range of from about 10 to about 200 g/m$^2$ depending on the substrate porosity.

The dispersions used in the present invention are applied to a substrate externally onto one or preferably both surfaces of the prepared substrate. For paper, preferably an amount of 0.05 to 0.28% fluorine based on the weight of paper is applied. Alternatively, the dispersions used in the present invention are applied internally into the body of the substrate, i.e., into paper pulp, preferably in an amount of 0.15 to 0.4% fluorine based on the weight of dried pulp. External application is preferred, and application to both sides of the substrate is preferred to single sided application. Particularly preferred is the use of a paper size press or padding process wherein the nip rolls ensure 2-sided penetration of the emulsion into the paper substrate. Suitable papers can be of any weight, but preferably are untreated with wax or other surface treatments that could impede wetting of the paper by the aqueous dispersion of the copolymers used in the present invention. Paper is unbleached or bleached. Many commercially available papers are suitable for use herein, for example Kraft papers available from SAPPI Fine Paper North America, Westbrook Me.

The substrate surface is dried between room temperature and about 150° C., preferably at about 80° C. This can optionally be followed by a heat treatment, which can range, depending on the nature of the salinized, quaternized, or amine oxide form are the same regardless of which polymerization process is employed.

Following polymerization the reaction mass is allowed to cool to a minimum of about 45° C., and drowned with stirring in a mixture of acetic acid and water. If allowed to cool too much it becomes thick and difficult to disperse. Preferably the reaction mass is drowned at the polymerization temperature or only allowed to cool to about 60° C. before drowning. The acetic acid solution is added to the reactor or the reactor contents poured into the acetic acid solution. A 25% to 100% excess of acetic acid over the stoichiometric amount needed to protonate all the amine groups in the copolymer is used. A larger excess of acetic acid is to be avoided to minimize odor.

Drowning in the acetic acid solution with agitation provides homogeneous dispersion of the amphoteric (meth)acrylate copolymer. While removal of solvents is required when water-insoluble solvents are present, it is optional for water-soluble solvents. Thus optionally, the polymerization solvents are removed by distillation or vacuum distillation (at about 80° C. to about 100° C. for the preferred isopropanol/methyl isobutyl ketone mixtures) to yield an aqueous dispersion of the amphoteric (meth)acrylate copolymer containing about 18% to about 30% solids. The percent solids of the dispersion are adjusted (standardized), if necessary, to be from about 18% to about 30% solids by dilution with water, or by distillation of excess water prior to use.

For effective application to a substrate, a dispersion that is free of gel particles, mobile, stable, and from which the solvent can be easily removed, is necessary. Gel particles are detected visually. The viscosity of the aqueous dispersion is typically less than about 1000 cp (1.0 Pa·s) at 25° C. Higher viscosities make solvent removal and dispersion more difficult. Stability requirements are preferably that no phase separation occurs on storage for 3 weeks at 45° C. Slight separation can be corrected by agitation, but is not preferred.

The copolymer dispersion as described above is contacted with the surface of a substrate to provide oil repellency. Suitable substrates substrate, up to 200° C. The substrates thus treated exhibit good oleophobic properties.

The dispersion is applied to the substrate at ambient temperature in the form of a mixture of about 2% of the copolymer dispersion (having from about 18% to about 30% solids) in water (about 98%), all proportions being by weight.

To obtain good attachment of the copolymers used in the invention to the substrates to which they have been applied, it is sometimes advantageous to combine the copolymer with certain additives, polymers, thermally condensable products and catalysts capable of promoting their crosslinking with the substrate. Examples of such additives include urea-formaldehyde or melamine-formaldehyde condensates or precondensates, epoxy derivates, such as diglycidylglycerol, polyamine-epichlorohydrin resins, glyoxal and its derivates, polyvinyl alcohols and cationic, and starches. Starch and poly(vinyl alcohol) are preferred. Suitable starches are a cornstarch such as PENFORD GUM 280, available from Penford Products Co., Cedar Rapids Iowa. Suitable poly(vinyl alcohol) is available from E. I. du Pont de Nemours and Company, Wilmington, Del. Such additives are denoted herein as adhesion promoters.

When starch or poly(vinyl alcohol) is used, a bath or diluted dispersion is prepared containing about 4 parts by weight of poly(vinyl alcohol) or starch and about 94 parts by weight of water. The mixture is heated to about 90-100° C. for about 45 minutes to dissolve the poly(vinyl alcohol) or starch, cooled to about 70° C., and 2 parts by weight of the copolymer dispersion (having 18-20% solids) is added. The application to the substrate is then performed with the dispersion maintained at about 70° C. to prevent any gelling of the poly(vinyl alcohol) or starch.

It can also be advantageous to combine the copolymers used in the method of the present invention with one or more nonionic and/or cationic surfactants in order to improve the wetting of the substrate. The weight of such surfactants with respect to the total weight of copolymer varies from 0 to about 10%. The surfactants can be added to the organic solution during the copolymerization reaction, during the dilution, to the aqueous composition obtained after distilling off the solvent, or at the time of application of the copolymer to the substrate.

The present invention further comprises substrates treated to provide oil repellency. The substrates are flexible fibrous nonwoven substrates. Suitable flexible, fibrous, nonwoven substrates include cellulosic papers and paper products, and flexible paper-like nonwoven products made from fibers of polymers and copolymers, inorganic materials such as glass in fibrous form, and natural fibrous materials. Preferred substrates are paper and paper pulp.

The substrates treated using the method of the present invention exhibit excellent oleophobic properties. The method and substrates of the present invention are useful in applications where oil repellency is desired. In particular, the substrates are useful in packaging for food. The treated substrates of the present invention are particularly useful as packaging because when bent or folded, the dried copolymer does not crack or split due to the excellent binding and cross linking between the copolymer and the substrate. This is advantageous for food packaging as it avoids any migration of the copolymer into the food, and prevents leaking of any oil or grease through the packaging. Of particular interest is application to paper to be used for the packaging of oily foods, such as oily pet foods.

A further advantage of the amphoteric (meth)acrylate copolymers of Structure A, the copolymers contain a lower molar proportion of fluorine than the corresponding copolymers of the prior art, thereby improving the fluorine efficiency of the protective coatings applied to substrates. By "fluorine efficiency" is meant the ability to use a minimum amount of fluorochemical to obtain the desired surface effect, such as repellency properties or stain resistance, when applied to substrates, or to obtain better performance using the same level of fluorine. A polymer having high fluorine efficiency generates the same or greater level of surface effect using a lower amount of fluorine than a comparative polymer.

Materials and Test Methods

The following materials and Test Methods were used in the examples herein.

1) The free radical sources, azobisisobutyronitrile, and 2,2'-azobis(2-methylbutyronitrile, and 4,4'-azobis(4-cyanopentanoic acid) are available from E. I. du Pont de Nemours and Company, Inc., Wilmington Del. as VAZO 64, VAZO 67, and VAZO 68 respectively.

2) Dimethylaminoethyl methacrylate is available from Arkema, Pierre-Benite, France.

3) 2-[methyl[(3,3,4,4,5,5,6,6,7,7,8,8,8-tridecafluorooctyl)sulfonyl]amino]ethyl acrylate (76% by weight) available from E. I. du Pont de Nemours and Company, Inc., Wilmington Del., herein designated as Monomer X.

4) Dipropylene glycol monomethyl ether and 1-methoxy-2-propanol are available as DOWANOL DPM and DOWANOL PM respectively from Dow Chemical Company, Midland Mich.

5) Mixed perfluoroalkylethyl acrylates, available from E. I. du Pont de Nemours and Company, Wilmington Del., as designated in Table 1 below.

6) Specific perfluoroalkylethyl acrylates, available from Oakwood Products Inc., West Columbia, S.C. as 2-(perfluorohexyl)ethyl acrylate (m is 3 in Formula 1A) and 2-(perfluorooctyl)ethyl acrylate (m is 4 in Formula 1A).

7) Specific perfluoroalkylethyl methacrylates, available Sigma-Aldrich Co., Milwaukee Wis., as 3,3,4,4,5,5,6,6,7,7,8,8,8-tridecafluorooctyl methacrylate.

TABLE 1

| Homolog Compositions | |
|---|---|
| Perfluoroalkylethyl (meth)acrylate | % by weight |
| Mixed perfluoroalkylethyl acrylates $F(CF_2CF_2)_mC_2H_4OC(O)-C(R)=CH_2$ (Formula 1B) (R = H and m = about 2 to about 10 in Formula 1B) | |
| m = 3 | 0.1-5 |
| m = 4 | 46-65 |
| m = 5 | 23-29 |
| m > 5 | 9-16 |
| 2-(Perfluorohexyl)ethyl acrylate (R = H and m = predominately 3 in Formula 1B above) | |
| m = 2 | 0.5-1.0 |
| m = 3 | 90-96 |
| m = 4 | 0.1-1.0 |
| 2-(Perfluorooctyl)ethyl acrylate (R = H and m = predominately 4 in Formula 1B above). | |
| m = 3 | 0.1-1.0 |
| m = 4 | 90-96 |
| m = 5 | 0.1-1.0 |
| 3,3,4,4,5,5,6,6,7,7,8,8,8-Tridecafluorooctyl methacrylate (R = methyl and m = predominately 3 in Formula 1B above) | |
| m = 2 | 0.1-1.0 |
| m = 3 | 95-99.5 |
| m = 4 | ND*-0.01 |
| Monomer X $CH_2=CH-COO-C_2H_4-N(CH_3)-SO_2-C_2H_4-(CF_2CF_2)_mF$ | |
| m = 2 | 0.1-1.0 |
| m = 3 | 95-99.5 |
| m = 4 | ND*-0.01 |

*ND = not detectable.

Test Method 1—Oil Penetration (Oil Repellency)

This test is similar to the "Felix" test described by Kantamneni in U.S. Pat. No. 6,566,470. It is a stringent test, carried out under conditions of dry or humid heat. A sturdy metal base, about 8×11 inches (20.3×27.9 cm) is used to support a 4×4 inch (10.2×10.2 cm) paper on which is printed a 10×10 grid, providing 100 squares of side 0.4 inches (1.02 cm). A 4×4 inch (10.2×10.2 cm) cut square of the treated bleached Kraft paper (62 g/m$^2$ for Condition A, and 81 g/m$^2$ for Condition B) is laid on a grid. An open metal cylindrical ring, height about 1 inch (2.5 cm) for Condition A and about 3 inch (7.6 cm) for Condition B, each of diameter 3.5 inches (8.9 cm) is placed on the test paper, and 40 g for Condition A (125 g for Condition B) oily food packed uniformly into the ring. The oily food employed was Royal Canin Junior dog food, obtained from Bd. du Jubile 71-Bte 4-1080, Brussells, Belgium. A 1-kg weight for Condition A (3-Kg weight for Condition B), in the shape of a short cylinder that fits inside the ring, is laid onto the surface of the packed food. The assembly is then stored in an oven at the selected temperature and humidity for 72 h. The conditions used were 60° C. and 0% relative humidity (Condition A) and 70° C. and 65% relative humidity (Condition B). The test assembly is removed from the oven, allowed to cool, and disassembled to retrieve the grid paper sheet. The test result is quantified by visual inspection and by counting the number of grid squares showing signs of oil or fat that has seeped through the test paper. The result is expressed as a percentage of the total number of grid squares (100). Perfect oil repellency is show by a score of 0% and higher values denote progressively poorer oil repellency.

Test Method 2—Water Absorptivity or "Cobb Test"

The "Cobb Test" (ISO 535 (1991) available from International Organization for Standardization, 1 ch. de la Voie-Creuse, Case postale 56, CH-1211 Geneva 20, Switzerland)

was utilized for the determination of the water absorptivity of paper and board. The paper was weighed immediately before and immediately after exposure during 15 s and 60 s of 100 cm$^2$ of paper to water, followed by blotting. The results of the increase in mass were expressed in grams per square meter (g/m$^2$). Lower values indicated lower absorptivity.

Test Method 3—Grease Migration or "Pet Food Test"

Pet food (about 200 g, Royal Canin AM 32 pet food, obtained from Bd. Du Jubili, 71-Bte-4-1080, Brussels, Belgium) having 20% fat content was applied in a frame onto paper (100 cm$^2$). Then a 3.5 kg weight that fits inside the frame was applied. The samples were transferred to a climatic oven and stored therein at 70° C. and 65% relative humidity for 3 days. The staining and "opacity loss" were measured respectively in percentage of stained surface (a lower percentage indicated lower grease migration) on a score of 0 to 5, where 5 indicated no opacity loss (i.e., no grease migration into the paper).

Test Method 4—Grease Resistance or "Oleic Acid Test"

The grease resistance of paper and board was measured using oleic acid (a fatty acid). A combination of oleic at different concentrations mixed with arachide oil was applied on the paper which was stored at 70° C. for 30 min. After the 30 min., the underside of the tested sample was observed to assess any migration of oleic acid through the paper and consequently any visible stains. The test assessed increasing penetration ability. The various solutions were scored 0 to 5, where 5 indicated no penetration, the most fat resistant surface.

|  | % Oleic Acid | % Arachide Oil |
|---|---|---|
| Solution 5 | 100 | 0 |
| Solution 4 | 87.5 | 12.5 |
| Solution 3 | 75 | 25 |
| Solution 2 | 50 | 50 |
| Solution 1 | 25 | 75 |
| Solution 0 | 0 | 100 |

EXAMPLES

Example 1

Sodium chloride (0.12 g), isopropyl alcohol (54 g), methylisobutylketone (78 g), diethylaminoethyl methacrylate (24.84 g), mixed perfluoroalkylethyl acrylates (described in Table 1) (115.2 g) containing 4 to about 20 carbons in the perfluoroalkyl group, corresponding to Formula 1A having R=H and m=2-10, n-dodecyl mercaptan (0.24 g), methacrylic acid (3 g), and acrylic acid (3 g) were charged into a 1-L flask equipped with a condenser and agitator. A solution of VAZO 64 (1.16 g) in methyl isobutyl ketone (14 g) was added to the flask. The reaction mass was agitated and purged with nitrogen for 1 h at 28° C. The temperature was then raised to 65° C. for the next 16 h. No gel material was observed in the flask toward the end of reaction.

After the 16 h of reaction time, the reaction mass was cooled to 63° C. A mixture of acetic acid (14.4 g) and water (600 g) was poured into the flask, converting the polymer to a homogenous dispersion. During the dispersion stage, the acetic/water mixture was maintained at about 55° C. with agitation. The isopropyl alcohol and methyl isobutyl ketone was then removed by distillation. The final dispersion contained 18.95% solids. The dispersion was applied to unbleached Kraft paper in the amounts listed in Test Method 1 and the paper was tested for oil repellency. The test results by Test Method 1, shown in Table 2, were 0% for both food tests under Condition A and B.

Example 2

Sodium chloride (0.12 g), isopropyl alcohol (54 g), methyl isobutyl ketone (78 g) diethylaminoethyl methacrylate (24.84 g), mixed perfluoroalkylethyl acrylates (described in Table 1) (115.2 g, as used in Example 1), and n-dodecyl mercaptan (0.24 g), methacrylic acid (3 g), acrylic acid (3 g) were charged in a 1-L flask, which was equipped with a condenser and agitator. A solution of VAZO 64 (1.16 g) in methyl isobutyl ketone (14 g) was added to the flask. The reaction mass was agitated and purged with nitrogen for 1 h at 28° C. The temperature was then raised to 73° C. for the next 16 h. No gel material was observed in the flask toward the end of reaction.

After the 16 h of reaction time, the reaction mass was cooled to 63° C. A mixture of acetic acid (14.4 g) and water (600 g) was poured into the flask, converting the polymer to be a homogenous dispersion. During the dispersion stage, the acetic/water mixture was maintained at about 55° C. with agitation. The isopropyl alcohol/methyl isobutyl ketone was then removed by distillation. The final dispersion contained 18.51% solid.

The dispersion was applied to unbleached Kraft paper in the amounts listed in Test Method 1 and the paper was tested for oil repellency. The test results by Test Method 1, shown in Table 2, were 0% for both food tests under Condition A and B. This example showed that a higher polymerization temperature was suitable to obtain good oil repellency.

Example 3

Sodium chloride (0.15 g), isopropyl alcohol (124 g), methyl isobutyl ketone (41 g), diethylaminoethyl methacrylate (27 g), glycidyl methacrylate (2.16 g), mixed perfluoroalkylethyl acrylates (described in Table 1) (144 g, as used in Example 1), and n-dodecyl mercaptan (0.3 g) were charged in a 1-L flask equipped with condenser and agitator. A solution of VAZO 64 (1.32 g) in isopropyl alcohol (17.5 g) was added drop wise to the flask. The reaction mass was agitated and purged with nitrogen for 1 h at 28° C. The temperature was then raised to 68° C. for the next 16 h. Glycidyl methacrylate (2.16 g), methacrylic acid (3.13 g), acrylic acid (2.4 g) and isopropyl alcohol (33.6 mL) were injected to the flask once the reaction mass reached 68° C. and then kept at that temperature for 4 h. No gel material was observed in the flask.

After the 16 h reaction time, the reaction mass was cooled to 65° C., then dispersed into a mixture containing acetic acid (14.4 g) and water (750 g). The flask was equipped with agitator agitation was maintained at about 150 rpm during the dispersion process. The isopropyl alcohol was then removed by distillation. The final dispersion contained 17.95% solid. The dispersion was applied to unbleached Kraft paper in the amounts listed in Test Method 1 and the paper was tested for oil repellency. The test results by Test Method 1, shown in Table 2, were 0% for both food tests under Condition A and B. This example showed that product with good oil repellency was made using the isopropyl alcohol and methyl isobutyl ketone mixed solvent with later injection of some monomers during the polymerization step. Also, gel formation was avoided during polymerization.

Example 4

Sodium chloride (0.12 g), isopropyl alcohol (54 g), methyl isobutyl ketone (78 g) diethylaminoethyl methacrylate (24.84 g), 2-(perfluorohexyl)ethyl acrylate (having R=H and m=3 predominately in Formula 1A above, 115.2 g), n-dodecyl mercaptan (0.24 g), methacrylic acid (4.8 g), and acrylic acid (4.8 g) were charged to a 1-L flask, which was equipped with a condenser and agitator. A solution of VAZO 64 (1.16 g) in methyl isobutyl ketone (14 g) was added to the flask. The reaction mass was agitated and purged with nitrogen for 1 h at 28° C. The temperature was then raised to 65° C. for the next 16 h. No gel material was observed in the flask toward the end of reaction.

After the 16 h of reaction time, the reaction mass was cooled to 63° C. A mixture of acetic acid (14.4 g) and water (600 g) was poured into the flask, converting the polymer to be a homogenous dispersion. During the dispersion stage, the acetic/water mixture was maintained at about 55° C. with agitation. The isopropyl alcohol/methyl isobutyl ketone was then removed by distillation. The final dispersion contained 20.39% solid.

The dispersion was applied to unbleached Kraft paper in the amounts listed in Test Method 1 and the paper was tested for oil repellency. The test results by Test Method 1, shown in Table 2, were 0% for both food tests under Condition A and B.

Example 5

Sodium chloride (0.12 g), isopropyl alcohol (52.33 g), methyl isobutyl ketone (75.58 g) diethylaminoethyl methacrylate (24.07 g), 2-(Perfluorooctyl)ethyl acrylate (having R=H and m=4 predominately in Formula 1A above, 111.60 g), n-dodecyl mercaptan (0.23 g), methacrylic acid (4.65 g), and acrylic acid (4.65 g) were charged to a 1-L flask, which was equipped with a condenser and agitator. A solution of VAZO 64 (1.12 g) in methyl isobutyl ketone (13.5 g) was added to the flask. The reaction mass was agitated and purged with nitrogen for 1 h at 28° C. The temperature was then raised to 65° C. for the next 16 h. No gel material was observed in the flask toward the end of reaction.

After the 16 h of reaction time, the reaction mass was cooled to 63° C. A mixture of acetic acid (13.95 g) and water (581.4 g) was poured into the flask, converting the polymer to be a homogenous dispersion. During the dispersion stage, the acetic/water mixture was maintained at about 55° C. with agitation. The isopropyl alcohol/methyl isobutyl ketone was then removed by distillation. The final dispersion contained 18.43% solid. The dispersion was applied to unbleached Kraft paper in the amounts listed in Test Method 1 and the paper was tested for oil repellency. The test results by Test Method 1, shown in Table 2, were 0% for both food tests under Condition A and B.

Example 6

Sodium chloride (0.12 g), isopropyl alcohol (54 g), methyl isobutyl ketone (78 g) diethylaminoethyl methacrylate (24.84 g), 3,3,4,4,5,5,6,6,7,7,8,8,8-tridecafluorooctyl methacrylate (having R=methyl and m=3 predominately in Formula 1A above, 103.7 g), n-dodecyl mercaptan (0.24 g), methacrylic acid (3.1 g), and acrylic acid (3.1 g) were charged in a 1-L flask, which was equipped with a condenser and agitator. A solution of VAZO 64 (1.16 g) in methyl isobutyl ketone (14 g) was added to the flask. The reaction mass was agitated and purged with nitrogen for 1 h at 28° C. The temperature was then raised to 65° C. for the next 16 h. No gel material was observed in the flask toward the end of reaction.

After the 16 h of reaction time, the reaction mass was cooled to 63° C. A mixture of acetic acid (14.4 g) and water (600 g) was poured into the flask, converting the polymer to a homogenous dispersion. During the dispersion stage, the acetic/water mixture was maintained at about 55° C. with agitation. The isopropyl alcohol/methyl isobutyl ketone was then removed by distillation. The final dispersion contained 20.86% solid. The dispersion was applied to unbleached Kraft paper in the amounts listed in Test Method 1 and the paper was tested for oil repellency. The test results by Test Method 1, shown in Table 2, were 0% for both food tests under Condition A and B.

Example 7

Sodium chloride (0.12 g), isopropyl alcohol (54 g), methyl isobutyl ketone (78 g) diethylaminoethyl methacrylate (24.84 g), 3,3,4,4,5,5,6,6,7,7,8,8,8-tridecafluorooctyl methacrylate (as used in Example 6, 115.2 g) containing predominately 6 carbons in the perfluoroalkyl group, prepared as described in Example 6, and n-dodecyl mercaptan (0.24 g), methacrylic acid (3.1 g), acrylic acid (3.1 g) and glycidyl methacrylate (2 g) were charged in a 1-L flask, which was equipped with a condenser and agitator. A solution of VAZO 67 (1.16 g) in methyl isobutyl ketone (14 g) was added to the flask. The reaction mass was agitated and purged with nitrogen for 1 h at 28° C. The temperature was then raised to 68° C. for the next 16 h. No gel material was observed in the flask toward the end of reaction.

After the 16 h of reaction time, the reaction mass was cooled to 63° C. A mixture of acetic acid (14.4 g) and water (600 g) was poured into the flask, converting the polymer to be a homogenous dispersion. During the dispersion stage, the acetic/water mixture was maintained at about 55° C. with agitation. The isopropyl alcohol/methyl isobutyl ketone was then removed by distillation. The final dispersion contained 20.91% solid. The dispersion was applied to unbleached Kraft paper in the amounts listed in Test Method 1 and the paper was tested for oil repellency. The test results by Test Method 1, shown in Table 2, were 0% for both food tests under Condition A and B.

Comparative Example A

Methyl isobutyl ketone (109.1 g), diethylaminoethyl methacrylate (24.95 g), mixed perfluoroalkylethyl acrylates (described in Table 1) (133 g, as used in Example 1), containing 4 to about 18 carbons in the perfluoroalkyl group, and glycidyl methacrylate (4 g) were charged in a 1-L flask, which was equipped with a condenser and agitator. A solution of VAZO 67 (1.25 g) in methyl isobutyl ketone (14 g) was added drop wise to the flask. The reaction mass was agitated and purged with nitrogen for 1 h at 28° C. The temperature was then raised to 68° C. for the next 16 h. No gel material was observed in the flask toward the end of reaction.

After the 16 hr of reaction time, the reaction mass was cooled to 65° C. A mixture of acetic acid (13.8 g) and water (310 g) was poured into the flask, converting the polymer to be a homogenous dispersion. During the dispersion stage, the acetic/water mixture was maintained at about 65° C. with agitation. The methyl isobutyl ketone was then removed by distillation. The final dispersion contained 25% solid. The dispersion was applied to unbleached Kraft paper in the amounts listed in Test Method 1 and the paper was tested for oil repellency. The test results by Test Method 1, shown in Table 2, were 70% for the food test under Condition A and 40% for the food test under Condition B. This example showed that product made without methacrylic and/or acrylic acid of component (c) performed poorer than product made with methacrylic and/or acrylic acid.

Comparative Example B

Sodium chloride (0.12 g), isopropyl alcohol (132 g), diethylaminoethyl methacrylate (21.6 g), mixed perfluoroalkylethyl acrylates (described in Table 1) (115.2 g, as used in Example 1) and n-dodecyl mercaptan (0.24 g) were charged in a 1-L flask, which was equipped with a condenser and agitator. A solution of VAZO 64 (1.06 g) in isopropyl alcohol (14 g) was added drop wise to the flask. The reaction mass was agitated and purged with nitrogen for 1 h at 28° C. The temperature was then raised to 68° C. for the next 16 h. A mixture of methacrylic acid (2.75 g) and acrylic acid (2.75 g) in isopropyl alcohol (81 mL) was injected to the flask once the reaction mass reached 68° C. and then kept at 68° C. for 9 h. Some gel material was observed in the flask toward the end of reaction.

After the 16 h of reaction time, the reaction mass was cooled to 65° C. A mixture of acetic acid (7.2 g) and water (600 g) was poured into the flask, converting the polymer to be a homogenous dispersion. During the dispersion stage, the acetic/water mixture was maintained at about 65° C. with agitation. The isopropyl alcohol was then removed by distillation. The final dispersion contained 19.81% solid. The dispersion was applied to unbleached Kraft paper in the amounts listed in Test Method 1 and the paper was tested for oil repellency. The test results by Test Method 1, shown in Table 2, were 0% for both food tests under Condition A and B. This example showed that product with good oil repellency could be made using isopropyl alcohol as the sole solvent and no glycidyl methacrylate, but some gel formation occurred during the polymerization.

Comparative Example C

Sodium chloride (0.12 g), methyl isobutyl ketone (132 g), diethylaminoethyl methacrylate (21.6 g), glycidyl methacrylate (1.73 g), mixed perfluoroalkylethyl acrylates (described in Table 1) (115.2 g, as used in Example 1), containing 4 to about 18 carbons in the perfluoroalkyl group, and n-dodecyl mercaptan (0.24 g) were charged in a 1-L flask equipped with condenser and agitator. A solution of VAZO 64 (1.06 g) in methyl isobutyl ketone (14 ml) was added drop wise to the flask. The reaction mass was agitated and purged with nitrogen for 1 h at 28° C. The temperature was then raised to 68° C. for the next 16 h. Glycidyl methacrylate (1.73 g), methacrylic acid (2.0 g), acrylic acid (1.0 g) and methyl isobutyl ketone (45 ml) was injected to the flask once the reaction mass reached 68° C. and then kept at that temperature for 5 h. Very thick material was observed in the flask.

After the 16 h reaction time, the reaction mass was cooled to 65° C., then dispersed into a mixture containing acetic acid (7.2 g) and water (600 g). The flask was equipped with agitator agitation was maintained at about 150 rpm during the dispersion process. The material was too thick to provide reasonable dispersion.

TABLE 2

| | | Oil Repellency | |
|---|---|---|---|
| Example | Dispersion Quality/% Solids | Condition A** | Condition B** |
| 1 | Good/18.95% | 0% | 0% |
| 2 | Good/18.51% | 0% | 0% |
| 3 | Good/17.95% | 0% | 0% |
| 4 | Good/20.93% | 0% | 0% |
| 5 | Good/18.43% | 0% | 0% |
| 6 | Good/20.86% | 0% | 0% |
| 7 | Good/20.91% | 0% | 0% |
| Comparative Examples | | | |
| A | Good/25.0% | 70% | 40% |
| B | Gel in polymer/19.81* | 0% | 0% |
| C | Gel too thick to test* | — | — |

*Solvent removal very difficult. Comparative Example B had poor stability.
**Conditions A and B are described in Test Method 1 above.

The data in Table 2 shows that use of the method of the present invention resulted in excellent oil repellency. In Examples 4, 5, 6, and 7, the $R_f$ moiety of the monomer of Formula 1 contained predominately 6 to 8 carbon atoms; thus demonstrating good oil repellency is obtained with use of less fluorine providing greater fluorine efficiency.

The data in Table 2 also showed that product made without the monomer of Formula 3, methacrylic and/or acrylic acid, (Comparative Example A) resulted in poorer oil repellency than product made with methacrylic and/or acrylic acid. Comparative Example B showed that, while product with good oil repellency could be made using isopropyl alcohol as the sole solvent, gel formation occurred during the polymerization. Comparative Example C showed that methyl isobutyl ketone solvent alone was inferior to the mixed isopropyl alcohol/methyl isobutyl ketone solvent system to produce good dispersed product when methacrylic and/or acrylic acid monomers were employed.

Examples 8-10

Syntheses were performed in a 750-mL reactor flask, equipped with a thermometer, condenser, and a cap allowing sampling and input for nitrogen bubbling. The condenser was cooled with a cryostat at 5° C. Monomer X (see Materials, above), DOWANOL PM and DPM, dimethylaminoethyl methacrylate, and methacrylic acid in the amounts shown in Table 3 were added to the reactor. A mechanical stirrer was used to homogenize the reaction mass. The medium was degassed by nitrogen bubbling in the medium for 30 min. The reactor was heated to 77° C. with mechanical stirring under nitrogen flow. VAZO 68 was added to start the reaction. After 4 h, additional VAZO 68 was added to complete the polymerization. No gel material was observed in the flask toward the end of the reaction. After 7 h, conversions were determined by GC (residual monomers) and by solid content determination. Then the temperature was decreased to 70° C. and the nitrogen flow was stopped. A solution of acetic acid in water was added drop by drop during 1.5 h. The temperature was maintained at 70° C. for 1 h. Acetone solvent (from Monomer X) was removed, and residual vinyl acetate was removed by distillation over about 3-4 hours at atmospheric pressure, with the temperature increased step by step up to 97° C.). The product was standardized at 26% solids with water. The final product was filtrated through a 100 micrometer nylon fabric. Examples 8 and 9 were tested according to Test Methods 3 and 4 with results shown in Tables 4 and 5 respectively. Examples 8 and 10 were tested according to Test Methods 3 and 4 with results in Table 6 and 7 respectively. Example 8 was tested in accordance with Test Method 3 with results in Table 8.

Example 11

Example 11 was prepared using the procedure of Examples 8-10 except that 2-(perfluorohexyl)ethyl acrylate was used instead of Monomer X.

Example 11 was tested according to Test Methods 3 and 4 with results in Tables 6 and 7.

Comparative Examples D, E and F

Comparative Examples D, E and F were prepared using the procedure of Examples 8-10 with the amounts of reactants as listed in Table 3. Comparative Examples D, E and F were each tested according to Test Methods 3 and 4 with the results listed in Tables 4 and 5 respectively.
Testing of Examples and Comparative Examples In the testing of the Examples 8-10 and Comparative Examples D-F, two substrate papers were used as the base paper as follows:

1) Paper A was 70 g/m² paper used for food wrapping and pet food bags outer ply. This paper had a Cobb test result of 15 s: 80 g/m² and a Gurley porosity of 14 s. The Cobb Test and Gurley Porosity test results, measured in seconds, are standard industry specifications performed by the paper manufacturer for papers intended for containing oily or wet contents.

2) Paper G was 72 g/m² paper used for fast food (deep fried potatoes such as "chips" or "French fries"), food wrapping and pet food bags. This paper had a Cobb test result of 15 s: 70 g/m² and a Gurley porosity test result of 24 s.

Two application methods were used to apply the test example to the paper, size press and wet-end treatment as follows:

1) Size Press:

The size press employed was from Werner Mathis, Concord, N.C. A size press bath at 60° C. was used to deposit the copolymer onto paper, controlled through wet-pick up measurement. Drying condition was for 75 at 125° C. with a Lorentzen Wettre rapid dryer (Lorentzen Wettre, Kista, Sweden).

2) Wet-end Treatment:

The copolymer of the invention was added to a suspension of pulp, which was then poured into a sheet former and dried. Tembec pulp (mixture of long and short fibers: 50%/50%) was supplied by Tembec Company, Montreal, Canada (short fibers from facility at Saint-Gaudens, France and long fibers from facility at Tarascon, France). 360 g of dry pulp was refined to 25° SR. The pH of the pulp was adjusted with sulfuric acid to 6.5. A fiber suspension was employed having a concentration of 10 g/L. A sample of a copolymer of the invention (20 g/L solution) was added to the pulp suspension. This was considered the starting time. After 15 seconds a sheet former machine was started. A Rapid-Köthen sheet forming machine (Thwing Albert Instrument Company, West Berlin, N.J.) was employed at 65 g/m². Retention aid if needed was POLYMIN SK (a polyamido-polyethyleneimine from BASF, Charlotte, N.C.). After 30 s, the solution was poured into the sheet former machine. The sheet was dried at 90° C. for 6 min.

TABLE 3

Polymer Reactant Compositions (wt %)*

| Example | Monomer X | DMAEMA | MAA | AC6 |
|---|---|---|---|---|
| Ex. 8 | 78% | 17% | 5% | 0% |
| Ex. 9 | 78% | 16% | 6% | 0% |
| Ex. 10 | 68% | 17% | 5% | 10% |
| Ex. 11 | 0% | 17% | 5% | 78% |
| Comp D | 80% | 18% | 2% | 0% |
| Comp E | 77% | 20% | 3% | 0% |
| Comp F | 85% | 15% | 0% | 0% |

*Abbreviations used in Table 3:
% wt is percent by weight
Comp indicates a Comparative Example.
Monomer X is described under Materials (above).
DMAEMA is Dimethylaminoethyl methacrylate.
MAA is Methacrylic acid
AC6 is 2-(Perfluorohexyl)ethyl acrylate

TABLE 4

Grease Migration (Test Method 3)

| Example | % fluorine on paper | Grease Migration Rating |
|---|---|---|
| Ex. 8 | 0.12 | 4-5 |
| Ex. 9 | 0.12 | 4 |
| Comparative Ex. D | 0.12 | 3 |
| Comparative Ex. E | 0.12 | 3 |
| Comparative Ex. F | 0.12 | 2 |

The data in Table 4 was generated using a size press application to Paper G. Table 4 indicates that Examples 8 and 9 were superior to Comparative Examples D, E and F in preventing migration of grease from the food onto the paper.

TABLE 5

Grease Resistance (Test Method 4)

| Example | % fluorine on paper | Grease Resistance Rating |
|---|---|---|
| Example 8 | 0.06 | 5 |
| Example 9 | 0.06 | 5 |
| Example 11 | 0.06 | 2 |
| Example 10 | 0.06 | 5 |
| Comparative Ex. D | 0.06 | 2 |
| Comparative Ex. E | 0.06 | 2 |
| Comparative Ex. F | 0.06 | 0 |

The data in Table 5 was generated using a size press application to Paper A. Table 5 shows that Examples 8, 9, and 10, each examples of $F(CF_2CF_2)_mC_2H_4SO_2N(CH_3)C_2H_4OC(O)C(R)=CH_2$ containing 5% by weight methacrylic acid (monomer of Formula 3), performed better than the Comparative Examples D, E, and F, containing 0 or 2% by weight methacrylic acid. Example 11 was comparable to the performance of Comparative Examples D, E and F in this testing run.

TABLE 6

Grease Migration (Test Method 3)

| Example | % fluorine on paper | Grease Migration Rating |
|---|---|---|
| Ex. 8 | 0.12 | 4/5 |
| Ex. 11 | 0.12 | 3 |
| Ex. 10 | 0.12 | 4/5 |

The data in Table 6 was generated using a size press application of the examples to Paper G. Table 6 shows that Examples 8, 10, and 11 demonstrated resistance to grease migration.

TABLE 8

Grease Migration (Test Method 3)

| | Example 8 | | |
|---|---|---|---|
| % Fluorine | 0.37 | 0.5 | 0.6 |
| Grease Migration | 3/4 | 4 | 5 |

The data in Table 8 was generated using a wet-end treatment application of the examples. This data demonstrated that wet end treatment application of the copolymer of the invention is effective for providing grease migration.

What is claimed is:

1. A method of imparting oil repellency and grease repellency to a substrate comprising contacting the substrate, which is selected from the group consisting of cellulosic papers, paper products, flexible paper-like nonwoven products, and inorganic materials in fibrous form, with a copolymer prepared from monomers copolymerized in the following percentages by weight:

(a) from about 60% to about 90% of a monomer of Formula 1, or a mixture thereof:

$$R_f\text{-}Q\text{-}CO\text{---}CR\text{=}CH_2 \quad \text{Formula 1}$$

wherein:
   $R_f$ is a straight- or branched-chain perfluoroalkyl group of 2 to about 20 carbon atoms or a mixture thereof,
   R is H or $CH_3$,
   Q is $-(C_nH_{2n})_pSO_2NR^1(C_nH_{2n}O)_y-$, or $-(C_nH_{2n})_xCONR^1(C_nH_{2n}O)_y-$, wherein the $-(C_nH_{2n})$ is bonded to $R_f$,
   $R^1$ is H or $C_1$-$C_{20}$ alkyl,
   each n is independently 1 to about 6, x is 0 to about 4, p is 1 to about 20, and y is 0 to about 4, provided that x+y is a positive integer;

(b) from about 10% to about 25% of a monomer of Formula 2, or a mixture thereof:

$$CH_2\text{=}C(R)COZ(CH_2)_q(CHR)_rNR^2R^3 \quad \text{Formula 2}$$

wherein
   R, is H or $CH_3$,
   $R^2$ and $R^3$ are each independently $C_1$-$C_4$ alkyl, hydroxyethyl, or benzyl or $R^2$ and $R^3$ together with the nitrogen atom form a morpholine, pyrrolidine, or piperidine ring,
   Z is $-O-$ or $-NR^4-$
   wherein
   $R^4$ is H or $C_1$-$C_4$ alkyl,
   r is 0 to 4, and
   q is 1 to 4,
   provided that the nitrogen bonded to $R^2$ and $R^3$ is from about 0% to 100% salinized, quaternized, or present as amine oxide; and (c) from about 1% to about 15% of a monomer of Formula 3, or a mixture thereof:

$$CH_2\text{=}CR(R^5)_e\text{---}COOH \quad \text{Formula 3}$$

wherein
   R is H or $CH_3$,
   $R^5$ is $CO(CH_2)_5$, $CO\text{---}O\text{---}(CH_2)_2$, $C_6H_4CHR$, or $CONRR^6$,
   $R^6$ is $C_6H_4OCH_2$, $(CH_2)_d$, or $C(CH_3)_2CH_2$,
   d is 1 to about 10, and
   e is 0 or 1,
   provided that when Formula 1 is $$F(CF_2CF_2)_mC_2H_4SO_2N(CH_3)C_2H_4OC\ (O)C(R)\text{=}CH_2$$

wherein
   m is from about 1 to about 10,
   then Formula 3 is present at a minimum of about 4% by weight.

2. The method of claim 1 wherein the composition is an aqueous dispersion.

3. The method of claim 1 wherein for Formula 1, $R_f$ is a straight- or branched-chain perfluoroalkyl group of 2 to about 20 carbon atoms or a mixture thereof.

4. The method of claim 3 wherein $R_f$ is a perfluoroalkyl group of 2 to about 6 carbon atoms or a mixture thereof.

5. The method of claim 1 wherein Formula 1 is $$F(CF_2CF_2)_mC_2H_4SO_2N(CH_3)C_2H_4OC(O)C(R)\text{=}CH_2$$

wherein
m is 1 to 3 or a mixture thereof, and
R is H or $CH_3$.

6. The method of claim 1 wherein Formula 2 is diethylaminoethyl (meth)acrylate or dimethylaminoethyl (methacrylate).

7. The method of claim 1 wherein Formula 3 is acrylic acid or methacrylic acid.

8. The method of claim 1 wherein the composition further comprises at least one of the monomers glycidyl (meth)acrylate, vinylidene chloride, alkyl (meth)acrylate, hydroxyalkylene (meth)acrylate or vinyl acetate.

9. The method of claim 1 wherein the contacting is external onto the substrate surface, or is internal into the substrate.

10. The method of claim 1 wherein the composition is contacted with the substrate surface in an amount of from about 0.05% to about 0.35% fluorine by weight percent of the substrate.

11. The method of claim 1 wherein the composition is added internally into the substrate in an amount of from about 0.2% to about 0.45% fluorine by weight of the substrate.

12. A substrate treated by the method of claim 1.

13. An improved process for the preparation of an amphoteric fluorochemical copolymer made from a mixture of monomers of a) Formula 1, b) Formula 2, and c) Formula 3, wherein (a) Formula 1 is $$R_f\text{-}Q\text{-}CO\text{---}CR\text{=}CH_2 \quad \text{Formula 1}$$

wherein:
   $R_f$ is a straight- or branched-chain perfluoroalkyl group of 2 to about 20 carbon atoms,
   R is H or $CH_3$,
   Q is $-(C_nH_{2n})_x(C_nH_{2n}O)_y-$, $-(C_nH_{2n})_pSO_2NR^1(C_nH_{2n}O)_y-$, or $-(C_nH_{2n})_xCONR^1(C_nH_{2n}O)_y-$, wherein the $-(C_nH_{2n})$ is bonded to $R_f$,
   $R^1$ is H or $C_1$-$C_{20}$ alkyl,
   each n is independently 1 to about 6, x is 0 to about 4, p is 1 to about 20, y is 0 to about 4, provided that x +y is a positive integer;

(b) Formula 2 is $$CH_2\text{=}C(R)COZ(CH_2)_q(CHR)_rNR^2R^3 \quad \text{Formula 2}$$

wherein
   R is H or $CH_3$,
   $R^2$ and $R^3$ are each independently $C_1$-$C_4$ alkyl, hydroxyethyl, or benzyl or R² and R³ together with the nitrogen atom form a morpholine, pyrrolidine, or piperidine ring, Z is —O— or —NR⁴—

Wherein

R⁴ is H or $C_1$-$C_4$ alkyl, r is 0 to 4, and q is 1 to 4, provided that the nitrogen bonded to R² and R³ is from about 0% to 100% salinized, quaternized, or present as amine oxide; and (c) Formula 3 is $$CH_2=CR(R^5)_e-COOH \qquad \text{Formula 3}$$

wherein

R is H or $CH_3$,

R⁵ is $CO(CH_2)_5$, $CO-O-(CH_2)_2$, $C_6H_4CHR$, or $CONRR^6$,

R⁶ is $C_6H_4OCH_2$, $(CH_2)_d$, or $C(CH_3)_2CH_2$, d is 1 to about 10, and e is 0 or 1, wherein the improvement comprises avoiding gel formation by delaying addition of Formula 3 to the mixture until after said mixture has reached a temperature of from about 60° C. to about 75° C.

14. The process of claim 13 wherein the solvent is a mixture of methylisobutyl ketone and isopropyl alcohol.

15. The process of claim 13 wherein Formula 3 is injected into the mixture when said mixture is under an inert atmosphere.

16. The process of claim 13 wherein Formula 3 is injected together with an optional monomer.

17. The process of claim 13 wherein the optional monomer is at least one of the monomers glycidyl (meth)acrylate, vinylidene chloride, an alkyl (meth)acrylate, a hydroxyalkylene (meth)acrylate, or a vinyl acetate.

18. A copolymer comprising monomers copolymerized in the following percentages by weight:

(a) from about 60% to about 90% of a monomer of Formula 1A or a mixture thereof:

$$R_f\text{-}Q\text{-}CO-CR=CH_2 \qquad \text{Formula 1A}$$

wherein:

$R_f$ is a straight- or branched-chain perfluoroalkyl group of 2 to about 20 carbon atoms, R is H or $CH_3$, Q is $-(C_nH_{2n})_pSO_2NR^1(C_nH_{2n}O)_y-$, wherein the $-(C_nH_{2n})$ is bonded to $R_f$, R¹ is H or $C_1$-$C_{20}$ alkyl and each n is independently 1 to about 6, p is 1 to about 20, and y is 0 to about 4, (b) from about 10% to about 25% of a monomer of Formula 2 or a mixture thereof:

$$CH_2=C(R)COZ(CH_2)_q(CHR)_rNR^2R^3 \qquad \text{Formula 2}$$

wherein

R is H or $CH_3$,

R² and R³ are each independently $C_1$- $C_4$ alkyl, hydroxyethyl, or benzyl or R² and R³ together with the nitrogen atom form a morpholine, pyrrolidine, or piperidine ring, Z is —O— or —NR⁴— wherein R⁴ is H or $C_1$- $C_4$ alkyl, r is 0 to 4, q is 1 to 4 and provided that the nitrogen bonded to R² and R³ is from about 0% to 100% salinized, quaternized, or present as amine oxide; and (c) from about 1% to about 15% of a monomer of Formula 3 or a mixture thereof:

$$CH_2=CR(R^5)_e-COOH \qquad \text{Formula 3}$$

wherein

R is H or $CH_3$,

R⁵ is $CO(CH_2)_5$, $CO-O-(CH_2)_2$, $C_6H_4CHR$, or $CONRR^6$,

R⁶ is $C_6H_4OCH_2$, $(CH_2)_d$, or $C(CH_3)_2CH_2$, d is 1 to about 10, and e is 0 or 1, provided that when Formula 1 is $$F(CF_2CF_2)_mC_2H_4SO_2N(CH_3)C_2H_4OC(O)C(R)=CH_2$$

wherein m is from about 1 to about 10, then Formula 3 is present at a minimum of about 4% by weight, said copolymer capable of imparting oil repellency and grease repellency to a flexible, fibrous nonwoven substrate.

19. A copolymer of claim 18 wherein $R_f$ is a perfluoroalkyl group of 2 to about 6 carbon atoms.

20. A copolymer of claim 18 wherein Formula 1 is $$F(CF_2CF_2)_mC_2H_4SO_2N(CH_3)C_2H_4OC(O)C(R)=CH_2$$

wherein m is 2 or 3 or a mixture thereof, and

R is H or $CH_3$.

21. A copolymer of claim 18 wherein Formula 2 is diethylaminoethyl (meth)acrylate or dimethylaminoethyl (meth)acrylate).

22. A copolymer of claim 18 wherein Formula 3 is acrylic acid or methacrylic acid.

23. A copolymer of claim 18 wherein the composition further comprises at least one of the monomers glycidyl (meth)acrylate, vinylidene chloride, alkyl (meth)acrylate, hydroxyalkylene (meth)acrylate, or vinyl acetate.

* * * * *